UNITED STATES PATENT OFFICE.

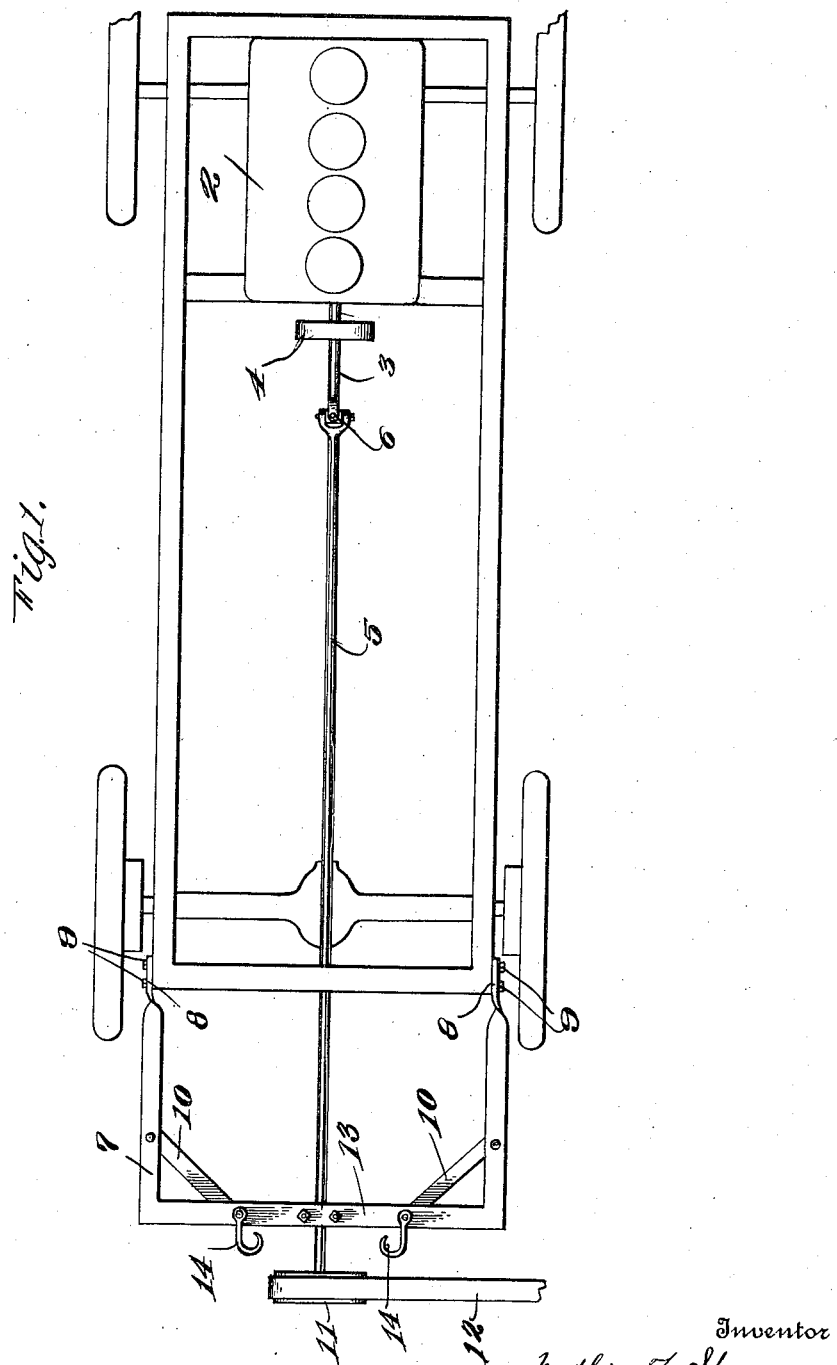

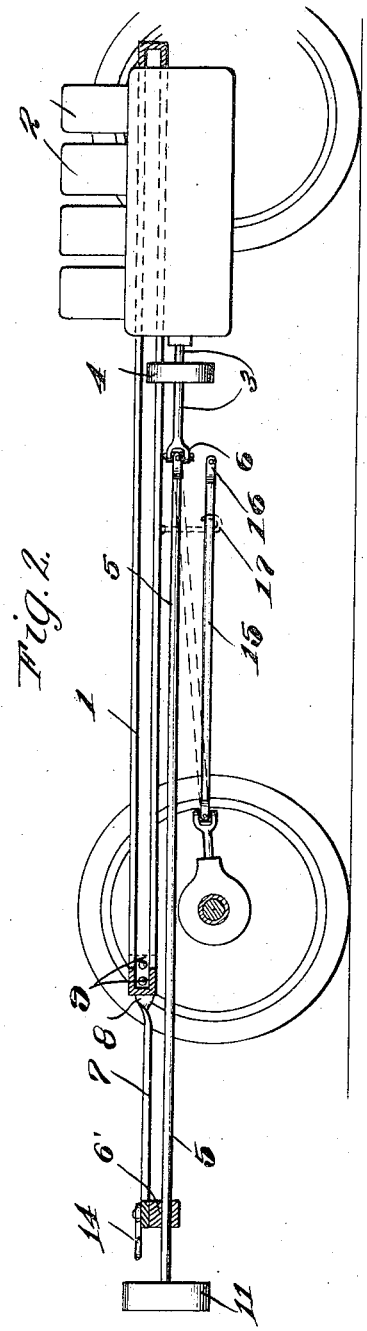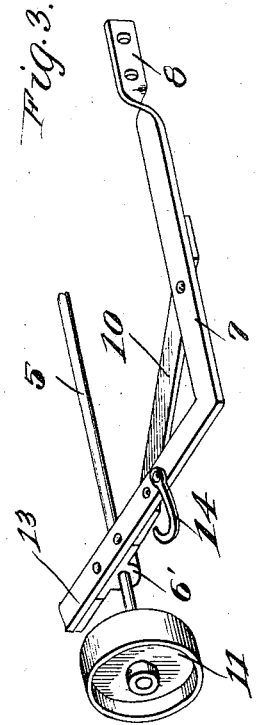

MATHIAS T. SPRANGERS, OF SAUK RAPIDS, MINNESOTA.

POWER TRANSMISSION.

1,166,555.  Specification of Letters Patent.  Patented Jan. 4, 1916.

Application filed June 21, 1913. Serial No. 775,078.

*To all whom it may concern:*

Be it known that I, MATHIAS T. SPRANGERS, a citizen of the United States, residing at Sauk Rapids, in the county of Benton and State of Minnesota, have invented certain new and useful Improvements in Power Transmission, of which the following is a specification.

This invention relates to power transmission mechanisms and more particularly to a mechanism of this nature which is constructed so as to be attached to pleasure or other motor vehicles for utilizing the power generated by the engine of the vehicle for various purposes, other than the propelling of the vehicles. In the devices of this nature now in use, the power of the engine of the vehicle is utilized for purposes other than the propelling of the vehicle, by means of putting a belt about one of the rear or drive wheels of the vehicle; mounting the rear or drive wheels upon rollers and connecting power transmission means, such as a belt, sprocket chain or the like, to the rollers; and various other similar transmission systems. These methods occasion considerable lost motion and consequently do not permit of the utilizing of the full power of the engine.

It is an object of this invention to provide a means for utilizing the power generated by the engine of a motor vehicle which does not employ the drive wheels of the vehicle as a power transmitting medium, therefore materially descreasing the amount of lost motion and adding to the efficiency of the engine for the various purposes for which it is employed.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters of reference designate like or corresponding parts throughout the several views, and in which, Figure 1 is a top plan view of the chassis of a motor vehicle showing the improved transmitting means applied thereto; Fig. 2 is a sectional view through a portion of the chassis of a motor vehicle showing the improved power-transmitting means applied thereto; and, Fig. 3 is a detail perspective view of a portion of the power-transmitting mechanism.

In the drawings, the numeral 1 designates the chassis of an ordinary motor vehicle having the engine or power-producing means 2 mounted thereupon. The engine or power-producing means 2 may be of any type or construction now upon the market and has a crank or power shaft 3 connected thereto in the usual manner. The power shaft 3 has a fly wheel 4 mounted thereupon and extending beyond the fly wheel is connected to a shaft 5 by means of the universal joint 6. The shaft 5 extends rearwardly along the chassis of the vehicle and is mounted in the bearing 6' which is supported by a frame 7. The frame 7 is preferably constructed of sheet metal, having its ends 8 twisted and secured to the side of the chassis by bolts or similar fastening means 9. The frame 7 has its outwardly extending corners braced by cross pieces 10.

A pulley 11 is rigidly mounted upon the extreme outer end of the shaft 5 which extends beyond the bearing 6' and may be connected by means of a belt 12 to any suitable type of machine (not shown) as is desired.

Secured to the rear cross piece 13 of the frame 7 are hooks 14 by means of which the chassis of the machine may be held rigidly in position; these hooks forming a means for securely anchoring the rear portion of the machine.

When it is not desired to use the motor vehicle as a stationary source of power for the operating of various types of machines, the shaft 5 is disconnected from the engine by means of the universal joints 6 and a shaft 15 which is connected to the driving mechanism of the vehicle in any suitable manner is connected to the engine and the shaft 3 by means of the portion of the universal coupling 16 which coöperates with the portion of the universal coupling 6 which is formed upon the end of the shaft 3. The shaft 15 is held rigidly in an inoperative position when not in use by means of a hook or other suitable support 17 which is connected to the chassis 1 of the motor vehicle.

In practical fields, certain minor features of construction, combination and arrangement of parts may necessitate alterations to which the patentee is entitled, provided such alterations are comprehended within the scope of what is claimed.

What is claimed is:—

The combination with a motor vehicle of a U-shaped frame formed of a continuous strip of metal, the strip comprising said frame being bent adjacent each end at ninety degrees to engage the vertical sides of the frame of the vehicle, means to secure the ends of said frame to the frame of the vehicle to retain the same in a rigid position, a bearing carried by said frame and located at the approximate center of the central extent of said U-shaped frame, a shaft journaled in said bearing to receive power motion from the power unit of the vehicle, means carried by the outer end of said shaft to permit the transmission of motion therefrom, the inner end of said shaft extended to a point approximate the power shaft of the vehicle and provided with a universal joint whereby motion generated by the power unit of the vehicle is transmitted to said shaft, and hooks carried by said frame on either side of said bearing mounted thereon to be engaged to secure the frame and maintain the vehicle in a position with the power transmitting means carried by the shaft in proper relation.

In testimony whereof I affix my signature in presence of two witnesses.

MATHIAS T. SPRANGERS.

Witnesses:
  ROSE SPRANGERS,
  DANIEL ARTIG.